United States Patent  
Oliveira et al.

(10) Patent No.: US 11,943,126 B1  
(45) Date of Patent: Mar. 26, 2024

(54) USING A TRAFFIC MONITORING SERVICE TO DETECT TRAFFIC PATTERN SHIFTS

(71) Applicant: AT&T Intellectual Property I, L.P., Atlanta, GA (US)

(72) Inventors: Carlos Oliveira, Wellington, FL (US); Harpreet Ahluwalia, Holmdel, NJ (US); Tzuu-Yi Wang, Newtown, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/973,946

(22) Filed: Oct. 26, 2022

(51) Int. Cl.
*H04L 43/0876* (2022.01)
*H04L 43/026* (2022.01)
*H04L 43/062* (2022.01)

(52) U.S. Cl.
CPC ........ *H04L 43/0876* (2013.01); *H04L 43/026* (2013.01); *H04L 43/062* (2013.01)

(58) Field of Classification Search
CPC .. H04L 43/0876; H04L 43/026; H04L 43/062
See application file for complete search history.

(56) References Cited

U.S. PATENT DOCUMENTS

| 7,756,043 B1 * | 7/2010 | Nucci | H04L 41/142 370/252 |
| 2010/0214920 A1 * | 8/2010 | Tewani | H04L 47/2441 370/232 |

OTHER PUBLICATIONS

Shen et al., "DynamicDeepFlow: An Approach for Identifying Changes in Network Traffic Flow Using Unsupervised Clustering," Lecture Noes in Computer Science book series (LNCS, vol. 13175), Mar. 23, 2022, pp. 98-116, 2022.
Neupane et al., "Using AI to Detect Malicious C2 Traffic," May 24, 2021, retrieved at https://unit42.paloaltonetworks.com/c2-traffic/.
Netvizura, NetVizura.com, 2022, retrieved at https://www.netvizura.com/ on Oct. 20, 2022.

* cited by examiner

Primary Examiner — Shirley X Zhang

(57) ABSTRACT

Using a traffic monitoring service to detect traffic pattern shifts can include obtaining netflow data and routing data for core routers. Based on the netflow data and the routing data, an augmented traffic matrix can be generated. A router-level analysis can be performed on the augmented traffic matrix to identify a pair of core routers that are associated with a traffic pattern shift in the network. An entity-level analysis can be performed on the pair of core routers to identify an entity that is responsible for the traffic pattern shift in the network. Traffic shift data that identifies the pair of core routers and the entity that is responsible for the traffic pattern shift in the network can be output.

20 Claims, 7 Drawing Sheets

USING A TRAFFIC MONITORING SERVICE TO DETECT TRAFFIC PATTERN SHIFTS

BACKGROUND

In some packet core networks, there can be a regular traffic pattern and traffic load. While this traffic pattern and traffic load may vary during the day and/or during days of the week, the general pattern and load may typically meet a pattern and/or load expectation compared to similar times and similar days of the week. Sometimes, however, a temporary spike in traffic may be noted outside of an expected time. Such spikes may be the result of one-time occurrences (e.g., a news event that causes a spike in network traffic). In such instances, the spikes in load should be ignored from a network capacity point of view to avoid wasting network resources. At other times, however, a spike in network load and/or a change in a pattern of traffic associated with a network may not be temporary and/or may impact network performance and capacity. Such traffic pattern shifts should be responded to with changes to the network, in some embodiments.

SUMMARY

The present disclosure is directed to using a traffic monitoring service to detect traffic pattern shifts. Two or more core routers can operate in communication with and/or as part of a network. The core routers can be configured to route traffic to, from, and/or across the network, with the traffic being generated by and/or being routed by or to one or more entities such as ingress entities originating traffic routed to one or more core routers, egress entities receiving traffic routed from one or more core routers, and/or other entities that are responsible for traffic associated with the network. The core routers and/or one or more devices in communication with the network and/or the core routers (e.g., a traffic monitoring device) can be configured to generate netflow data. The netflow data can indicate, for example, devices (e.g., the entities) that are generating and/or sending data associated with traffic flowing to and/or through the core routers, packet attributes associated with the traffic flowing to and/or through the core routers, and/or other aspects of the traffic.

A server computer can operate in communication with and/or as part of the network. The server computer can host and/or execute one or more application programs such as the netflow data collector, the traffic matrix generator, and/or the traffic monitoring service. The netflow data collector can be configured to obtain and analyze netflow data associated with devices (e.g., the entities) connecting to the network through and/or via the core routers. It should be understood that these examples are illustrative, and therefore should not be construed as being limiting in any way.

The traffic matrix generator can be configured to generate, based on the netflow data and routing data obtained from one or more data sources, an augmented traffic matrix. According to various embodiments, the data sources can include an interface inventory and one or more routing tables. The traffic matrix generator can be configured to compile the augmented traffic matrix between pairs of core routers over a time period. The traffic matrix generator can be configured to augment information from the five tuple flows in the netflow data by adding information obtained in the routing data. Specifically, the routing data illustrated and described herein can identify neighboring ingress and egress autonomous systems (e.g., a neighboring ingress and egress entity), which can be obtained from an interface inventory; and the originating and terminating autonomous systems (e.g., originating and terminating entities), which can be determined based on information in a routing table. It should be understood that these examples are illustrative, and therefore should not be construed as being limiting in any way.

The traffic monitoring service can be configured to obtain the augmented traffic matrix and perform several levels of analysis on the augmented traffic matrix to identify traffic pattern shifts and entities (e.g., the entities) responsible for the traffic pattern shifts. In particular, the traffic monitoring service can be configured to select a pair of core routers and determine, for the pair of core routers, if traffic between the core routers has shifted in a significant manner. In particular, the traffic monitoring service can be configured to create, for the pair of core routers (any two core routers that are exchanging traffic) a number of time series that can represent a proportion of network traffic that is occurring between the pair of core routers relative to the overall network traffic at a given time period over a number of days, weeks, or the like. The time series can be determined for one or more, or each, hour of the day over a number of days for which a rolling history is maintained (based on the netflow data) such as, for example, a time series for traffic during the 9:00 to 10:00 hour over ten days, twenty-one days, or the like. It should be understood that this example is illustrative, and therefore should not be construed as being limiting in any way.

After creating separate time series for each hour of the day for the pair of core routers, the traffic monitoring service can calculate for the pair of core routers a standard deviation and the autoregressive integrated moving average ("ARIMA") regression confidence interval for proportion of traffic between the pair of routers relative to all network traffic. Thus, as used herein, it should be understood that the term "router-level utilization" in association with the router-level analysis illustrated and described herein is used to refer to this proportion, i.e., the proportion of traffic between the selected pair of routers relative to all network traffic. The traffic monitoring service can then determine if any of the determined hourly utilizations for the pair of core routers exceeds the determined standard deviation by a certain factor (either above or below the standard deviation).

The traffic monitoring service can also determine if any of the determined hourly utilizations for the pair of core routers is outside of the determined ARIMA confidence interval. If any of the hourly utilizations for the pair of core routers exceeds the standard deviation by a certain factor (either above or below the standard deviation) and also falls outside of the ARIMA confidence interval for more than a set period of time (e.g., for two days, for three days, etc.), then the pair of core routers can be identified as having a traffic pattern shift. The use of the set period of time as illustrated and described herein can ensure that any detected traffic changes are not merely temporary (e.g., event-driven) spikes or one-time changes, but rather are identified as long-term changes in traffic and therefore deserving of attention. It should be understood that this example is illustrative, and therefore should not be construed as being limiting in any way. It can be appreciated that this level of analysis corresponds to a router-level analysis of the augmented traffic matrix and the result can include a pair of core routers that are experiencing a traffic pattern shift. It should be understood that this example is illustrative, and therefore should not be construed as being limiting in any way.

According to various embodiments of the concepts and technologies disclosed herein, for one or more pairs of core routers that are determined as having a long-term traffic pattern shift, the traffic monitoring service can perform an entity-level analysis to identify the entities responsible for the long-term traffic pattern shift. In particular, the traffic monitoring service can be configured to identify an entity (e.g., an Internet services provider ("ISP") autonomous system ("AS")) that is closest to an originating point of traffic associated with the pair of core routers, or an ISP AS closest to the network being considered. In the second level (the entity-level) analysis, another time series can be constructed. In the entity-level analysis, the time series can be calculated (again for one or more or each hour over a number of days, weeks, or the like). In the entity-level of analysis, the utilization metric is defined as the proportion of traffic between each major entity that is a source of traffic to the destination core router of the pair of core routers identified in the router-level of analysis, relative to the total traffic between the pair of core routers.

In the entity-level of analysis, the determined utilization metrics over the time series are compared to the standard deviation and ARIMA confidence interval for the time series. Again, the time series in the entity-level of analysis can be constructed separately for each hour of the day over a multi-day (e.g., twenty one days, thirty days, etc.) rolling window. If the utilization metric defined for this level exceeds the standard deviation for the series by a certain factor (either above or below) and falls outside the ARIMA confidence interval for the time series for more than a set period of time (e.g., two days, three days, etc.), the entity identified above (e.g., the ISP AS closest to an originating point of traffic associated with the pair of core routers or an ISP AS closest to the network being considered) can be positively identified as the responsible party for the traffic pattern shift. Again, the use of the set period of time as illustrated and described herein can ensure that any detected traffic changes are not temporary and are long-term changes in traffic. As such, when a pair of routers is marked and/or when an entity is identified as illustrated and described herein, this is the result of only long term traffic changes and not due to temporary spikes in traffic. It should be understood that this example is illustrative, and therefore should not be construed as being limiting in any way.

The traffic monitoring service also can be configured to generate and output information or data that indicates that a traffic pattern shift has occurred and the entities responsible for the traffic pattern shift. In particular, in various embodiments of the concepts and technologies disclosed herein, the traffic monitoring service can be configured to generate traffic shift data that indicates that a traffic pattern shift has occurred (e.g., between a pair of core routers), the identity of the two or more core routers affected by the traffic pattern shift, and the identity of the one or more entities responsible for the traffic pattern shift. The traffic monitoring service can be configured to provide the traffic shift data to a user associated with a management device. The management device or operating group can take one or more actions in response to identifying the traffic pattern shift such as, for example, increasing capacity of one or more core routers, instantiating a new core router, balance loading and/or rerouting of traffic associated with the entity identified as being responsible for the traffic pattern shift, combinations thereof, or the like.

According to one aspect of the concepts and technologies disclosed herein, a system is disclosed. The system can include a processor and a memory. The memory can store computer-executable instructions that, when executed by the processor, cause the processor to perform operations. The operations can include obtaining netflow data for two or more core routers associated with a network and routing data associated with the two or more core routers. The routing data can be obtained from an interface inventory and a routing table. The operations further can include generating, based on the netflow data and the routing data, an augmented traffic matrix; performing, on the augmented traffic matrix, a router-level analysis to identify, among the two or more core routers, a pair of core routers that are associated with a traffic pattern shift in the network; performing, on the pair of core routers, an entity-level analysis to identify, among two or more entities, an entity that is responsible for the traffic pattern shift in the network; and outputting traffic shift data that identifies the pair of core routers and the entity that is responsible for the traffic pattern shift in the network.

In some embodiments, the router-level analysis can include selecting, from the two or more core routers, the pair of core routers and generating a time series for the pair of core routers. The time series can include router-level utilizations of the pair of core routers for a particular hour of the day, where the router-level utilizations of the pair of core routers can include proportions of traffic between the pair of core routers relative to all traffic in the network. The router-level analysis further can include calculating a standard deviation and an ARIMA confidence interval for the router-level utilizations of the pair of core routers; determining if, for the daily time series for the particular hour of the day, an hourly router-level utilization of the pair of core routers exceeds the standard deviation from an average utilization for the pair of core routers by a specified factor; if a determination is made that the hourly router-level utilization of the pair of core routers exceeds the standard deviation from the average utilization for the pair of core routers by the specified factor, determining if the hourly router-level utilization of the pair of core routers exceeds the ARIMA confidence interval for the utilizations of the pair of core routers; and if a determination is made that the hourly router-level utilization of the pair of core routers exceeds the ARIMA confidence interval for the utilizations of the pair of core routers, marking the pair of core routers as responsible for the traffic pattern shift in the network.

In some embodiments, the entity-level analysis can include selecting, from two or more entities between the pair of core routers, entities that are a major source of traffic to the pair of core routers; and calculating entity-level utilization for the entity. The entity-level utilization can include a proportion of traffic between the entity and a destination core router of the pair of core routers relative to all traffic between the pair of core routers. The entity-level analysis further can include generating a daily time series for the two or more entities between the pair of core routers, the time series including entity-level utilizations between an entity of the two or more entities between the core routers for a particular hour of the day; calculating a standard deviation and an ARIMA confidence interval for the utilizations of the pair of core routers for the traffic associated with the entity and the pair of core routers; determining if an hourly utilization of the pair of core routers exceeds the standard deviation from an average utilization for the pair of core routers for the traffic associated with the entity; if a determination is made that the hourly utilization of the pair of core routers for the traffic associated with the entity exceeds the standard deviation from the average utilization for the pair of core routers, determining if the hourly utilization of the pair of core routers for the traffic associated with the entity exceeds the ARIMA confidence interval for the utilizations of the pair of core routers; and if a determination is made that the hourly utilization of the pair of core routers for the traffic associated with the entity exceeds the ARIMA confidence interval for the utilizations of the pair of core routers, determining that the entity is responsible for the traffic pattern shift in the network.

In some embodiments, the operations further can include determining if the traffic pattern shift satisfies a time constraint; and in response to determining that the traffic pattern shift satisfies the time constraint, outputting the traffic shift data. In some embodiments, the netflow data and the routing data can be stored for a rolling time period that can include a number of days, and a first-in-first-out model can be used for storing the netflow data and the routing data. In some embodiments, the entity can include an Internet service provider autonomous system that is closest, among two or more Internet service provider autonomous systems, to an originating point of traffic associated with the pair of core routers. In some embodiments, the entity can include an Internet service provider autonomous system that is closest, among two or more Internet service provider autonomous systems, to the network.

According to another aspect of the concepts and technologies disclosed herein, a method is disclosed. The method can include obtaining, by a computer including a processor, netflow data for two or more core routers associated with a network and routing data associated with the two or more core routers. The routing data can be obtained from an interface inventory and a routing table. The method further can include generating, by the processor and based on the netflow data and the routing data, an augmented traffic matrix; performing, by the processor and on the augmented traffic matrix, a router-level analysis to identify, among the two or more core routers, a pair of core routers that are associated with a traffic pattern shift in the network; performing, by the processor and on the pair of core routers, an entity-level analysis to identify, among two or more entities, an entity that is responsible for the traffic pattern shift in the network; and outputting, by the processor, traffic shift data that identifies the pair of core routers and the entity that is responsible for the traffic pattern shift in the network.

In some embodiments, the router-level analysis can include selecting, from the two or more core routers, the pair of core routers and generating a time series for the pair of core routers. The time series can include router-level utilizations of the pair of core routers for a particular hour of the day, where the router-level utilizations of the pair of core routers can include proportions of traffic between the pair of core routers relative to all traffic in the network. The router-level analysis further can include calculating a standard deviation and an ARIMA confidence interval for the router-level utilizations of the pair of core routers; determining if, for the daily time series for the particular hour of the day, an hourly router-level utilization of the pair of core routers exceeds the standard deviation from an average utilization for the pair of core routers by a specified factor; if a determination is made that the hourly router-level utilization of the pair of core routers exceeds the standard deviation from the average utilization for the pair of core routers by the specified factor, determining if the hourly router-level utilization of the pair of core routers exceeds the ARIMA confidence interval for the utilizations of the pair of core routers; and if a determination is made that the hourly router-level utilization of the pair of core routers exceeds the ARIMA confidence interval for the utilizations of the pair of core routers, marking the pair of core routers as responsible for the traffic pattern shift in the network.

In some embodiments, the entity-level analysis can include selecting, from two or more entities between the pair of core routers, entities that are a major source of traffic to the pair of core routers; and calculating entity-level utilization for the entity. The entity-level utilization can include a proportion of traffic between the entity and a destination core router of the pair of core routers relative to all traffic between the pair of core routers. The entity-level analysis further can include generating a daily time series for the two or more entities between the pair of core routers, the time series including entity-level utilizations between an entity of the two or more entities between the core routers for a particular hour of the day; calculating a standard deviation and an ARIMA confidence interval for the utilizations of the pair of core routers for the traffic associated with the entity and the pair of core routers; determining if an hourly utilization of the pair of core routers exceeds the standard deviation from an average utilization for the pair of core routers for the traffic associated with the entity; if a determination is made that the hourly utilization of the pair of core routers for the traffic associated with the entity exceeds the standard deviation from the average utilization for the pair of core routers, determining if the hourly utilization of the pair of core routers for the traffic associated with the entity exceeds the ARIMA confidence interval for the utilizations of the pair of core routers; and if a determination is made that the hourly utilization of the pair of core routers for the traffic associated with the entity exceeds the ARIMA confidence interval for the utilizations of the pair of core routers, determining that the entity is responsible for the traffic pattern shift in the network.

In some embodiments, the method further can include determining if the traffic pattern shift satisfies a time constraint; and in response to determining that the traffic pattern shift satisfies the time constraint, outputting the traffic shift data. In some embodiments, the netflow data and the routing data can be stored for a rolling time period that can include a number of days, and a first-in-first-out model can be used for storing the netflow data and the routing data. In some embodiments, the entity can include an Internet service provider autonomous system that is closest, among two or more Internet service provider autonomous systems, to an originating point of traffic associated with the pair of core routers. In some embodiments, the entity can include an Internet service provider autonomous system that is closest, among two or more Internet service provider autonomous systems, to the network.

According to yet another aspect of the concepts and technologies disclosed herein, a computer storage medium is disclosed. The computer storage medium can store computer-executable instructions that, when executed by a processor, cause the processor to perform operations. The operations can include obtaining netflow data for two or more core routers associated with a network and routing data associated with the two or more core routers. The routing data can be obtained from an interface inventory and a routing table. The operations further can include generating, based on the netflow data and the routing data, an augmented traffic matrix; performing, on the augmented traffic matrix, a router-level analysis to identify, among the two or more core routers, a pair of core routers that are associated with a traffic pattern shift in the network; performing, on the pair of core routers, an entity-level analysis to identify, among two or more entities, an entity that is responsible for the traffic pattern shift in the network; and outputting traffic shift data that identifies the pair of core routers and the entity that is responsible for the traffic pattern shift in the network.

In some embodiments, the router-level analysis can include selecting, from two or more core routers, a pair of core routers and generating a time series for the pair of core routers. The time series can include router-level utilizations of the pair of core routers for a particular hour of the day, where the router-level utilizations of the pair of core routers can include proportions of traffic between the pair of core routers relative to all traffic in the network. The router-level analysis further can include calculating a standard deviation and an ARIMA confidence interval for the router-level utilizations of the pair of core routers; determining if, for the daily time series for the particular hour of the day, an hourly router-level utilization of the pair of core routers exceeds the standard deviation from an average utilization for the pair of core routers by a specified factor; if a determination is made that the hourly router-level utilization of the pair of core routers exceeds the standard deviation from the average utilization for the pair of core routers by the specified factor, determining if the hourly router-level utilization of the pair of core routers exceeds the ARIMA confidence interval for the utilizations of the pair of core routers; and if a determination is made that the hourly router-level utilization of the pair of core routers exceeds the ARIMA confidence interval for the utilizations of the pair of core routers, marking the pair of core routers as responsible for the traffic pattern shift in the network.

In some embodiments, the entity-level analysis can include selecting, from two or more entities between the pair of core routers, entities that are a major source of traffic to the pair of core routers; and calculating entity-level utilization for the entity. The entity-level utilization can include a proportion of traffic between the entity and a destination core router of the pair of core routers relative to all traffic between the pair of core routers. The entity-level analysis further can include generating a daily time series for the two or more entities between the pair of core routers, the time series including entity-level utilizations between an entity of the two or more entities between the core routers for a particular hour of the day; calculating a standard deviation and an ARIMA confidence interval for the utilizations of the pair of core routers for the traffic associated with the entity and the pair of core routers; determining if an hourly utilization of the pair of core routers exceeds the standard deviation from an average utilization for the pair of core routers for the traffic associated with the entity; if a determination is made that the hourly utilization of the pair of core routers for the traffic associated with the entity exceeds the standard deviation from the average utilization for the pair of core routers, determining if the hourly utilization of the pair of core routers for the traffic associated with the entity exceeds the ARIMA confidence interval for the utilizations of the pair of core routers; and if a determination is made that the hourly utilization of the pair of core routers for the traffic associated with the entity exceeds the ARIMA confidence interval for the utilizations of the pair of core routers, determining that the entity is responsible for the traffic pattern shift in the network.

In some embodiments, the operations further can include determining if the traffic pattern shift satisfies a time constraint; and in response to determining that the traffic pattern shift satisfies the time constraint, outputting the traffic shift data. In some embodiments, the netflow data and the routing data can be stored for a rolling time period that can include a number of days, and a first-in-first-out model can be used for storing the netflow data and the routing data. In some embodiments, the entity can include an Internet service provider autonomous system that is closest, among two or more Internet service provider autonomous systems, to an originating point of traffic associated with the pair of core routers. In some embodiments, the entity can include an Internet service provider autonomous system that is closest, among two or more Internet service provider autonomous systems, to the network.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
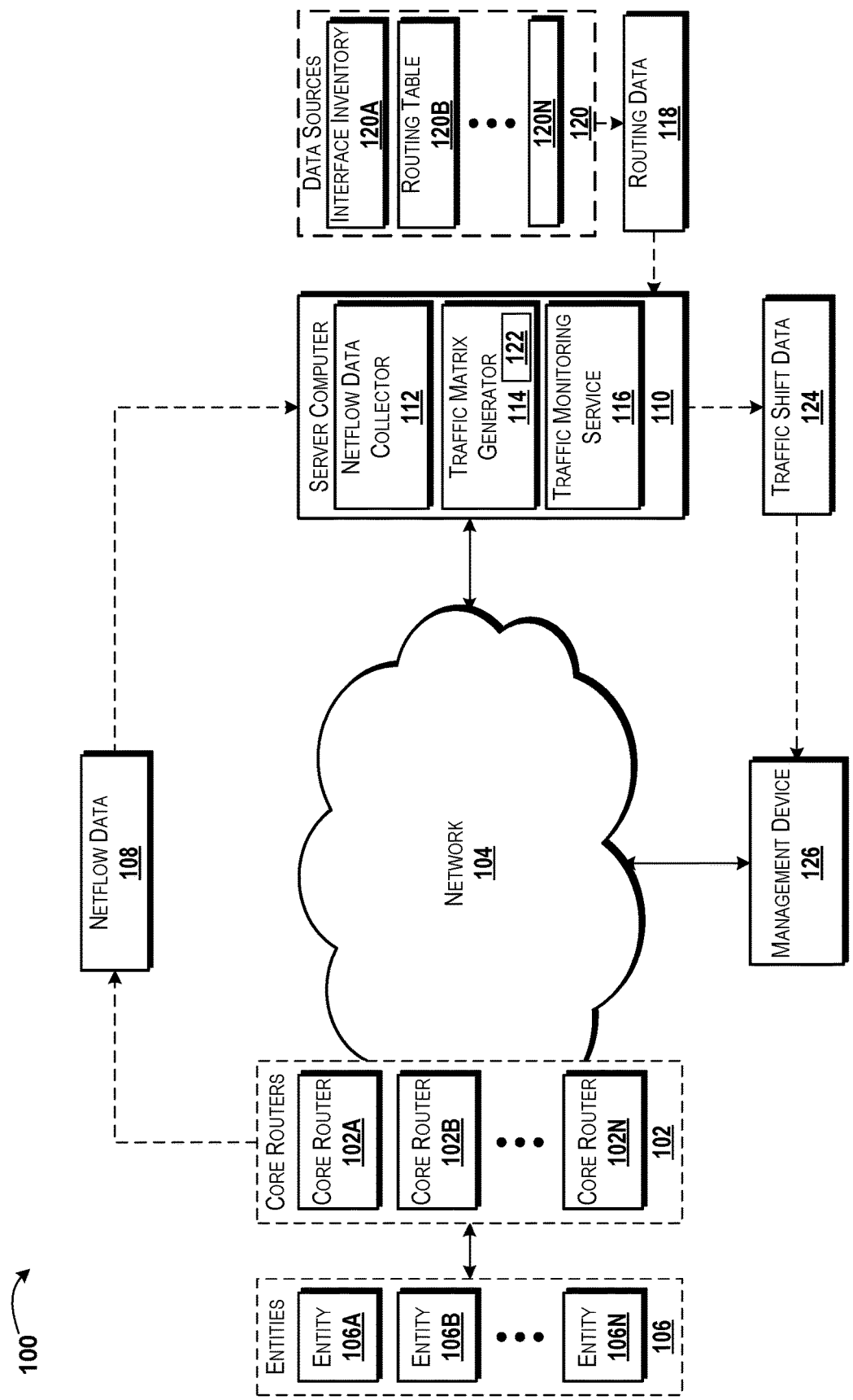
FIG. 1 is a system diagram illustrating an illustrative operating environment for various embodiments of the concepts and technologies described herein.

The following detailed description is directed to using a traffic monitoring service to detect traffic pattern shifts. Two or more core routers can operate in communication with and/or as part of a network. The core routers can be configured to route traffic to, from, and/or across the network, with the traffic being generated by and/or being routed by or to one or more entities such as ingress entities originating traffic routed to one or more core routers, egress entities receiving traffic routed from one or more core routers, and/or other entities that are responsible for traffic associated with the network. The core routers and/or one or more devices in communication with the network and/or the core routers (e.g., a traffic monitoring device) can be configured to generate netflow data. The netflow data can indicate, for example, devices (e.g., the entities) that are generating and/or sending data associated with traffic flowing to and/or through the core routers, packet attributes associated with the traffic flowing to and/or through the core routers, and/or other aspects of the traffic.

A server computer can operate in communication with and/or as part of the network. The server computer can host and/or execute one or more application programs such as the netflow data collector, the traffic matrix generator, and/or the traffic monitoring service. The netflow data collector can be configured to obtain and analyze netflow data associated with devices (e.g., the entities) connecting to the network through and/or via the core routers. It should be understood that these examples are illustrative, and therefore should not be construed as being limiting in any way.

The traffic matrix generator can be configured to generate, based on the netflow data and routing data obtained from one or more data sources, an augmented traffic matrix. According to various embodiments, the data sources can include an interface inventory and one or more routing tables. The traffic matrix generator can be configured to compile the augmented traffic matrix between pairs of core routers over a time period. The traffic matrix generator can be configured to augment information from the five tuple flows in the netflow data by adding information obtained in the routing data. Specifically, the routing data illustrated and described herein can identify neighboring ingress and egress autonomous systems (e.g., a neighboring ingress and egress entity), which can be obtained from an interface inventory; and the originating and terminating autonomous systems (e.g., originating and terminating entities), which can be determined based on information in a routing table. It should be understood that these examples are illustrative, and therefore should not be construed as being limiting in any way.

The traffic monitoring service can be configured to obtain the augmented traffic matrix and perform several levels of analysis on the augmented traffic matrix to identify traffic pattern shifts and entities (e.g., the entities) responsible for the traffic pattern shifts. In particular, the traffic monitoring service can be configured to select a pair of core routers and determine, for the pair of core routers, if traffic between the core routers has shifted in a significant manner. In particular, the traffic monitoring service can be configured to create, for the pair of core routers (any two core routers that are exchanging traffic) a number of time series that can represent a proportion of network traffic that is occurring between the pair of core routers relative to the overall network traffic at a given time period over a number of days, weeks, or the like. The time series can be determined for one or more, or each, hour of the day over a number of days for which a rolling history is maintained (based on the netflow data) such as, for example, a time series for traffic during the 9:00 to 10:00 hour over ten days, twenty-one days, or the like. It should be understood that this example is illustrative, and therefore should not be construed as being limiting in any way.

After creating separate time series for each hour of the day for the pair of core routers, the traffic monitoring service can calculate for the pair of core routers a standard deviation and the ARIMA regression confidence interval for proportion of traffic between the pair of routers relative to all network traffic. The traffic monitoring service can then determine if any of the determined hourly utilizations for the pair of core routers exceeds the determined standard deviation by a certain factor (either above or below the standard deviation).

The traffic monitoring service can also determine if any of the determined hourly utilizations for the pair of core routers is outside of the determined ARIMA confidence interval. If any of the hourly utilizations for the pair of core routers exceeds the standard deviation by a certain factor (either above or below the standard deviation) and also falls outside of the ARIMA confidence interval for more than a set period of time (e.g., for two days, for three days, etc.), then the pair of core routers can be identified as having a traffic pattern shift. The use of the set period of time as illustrated and described herein can ensure that any detected traffic changes are not merely temporary (e.g., event-driven) spikes or one-time changes, but rather are identified as long-term changes in traffic and therefore deserving of attention. It should be understood that this example is illustrative, and therefore should not be construed as being limiting in any way. It can be appreciated that this level of analysis corresponds to a router-level analysis of the augmented traffic matrix and the result can include a pair of core routers that are experiencing a traffic pattern shift. It should be understood that this example is illustrative, and therefore should not be construed as being limiting in any way.

According to various embodiments of the concepts and technologies disclosed herein, for one or more pairs of core routers that are determined as having a long-term traffic pattern shift, the traffic monitoring service can perform an entity-level analysis to identify the entities responsible for the long-term traffic pattern shift. In particular, the traffic monitoring service can be configured to identify an entity (e.g., an Internet services provider ("ISP") autonomous system ("AS")) that is closest to an originating point of traffic associated with the pair of core routers, or an ISP AS closest to the network being considered. In the second level (the entity-level) analysis, another time series can be constructed. In the entity-level analysis, the time series can be calculated (again for one or more or each hour over a number of days, weeks, or the like). In the entity-level of analysis, the utilization metric is defined as the proportion of traffic between each major entity that is a source of traffic to the destination core router of the pair of core routers identified in the router-level of analysis, relative to the total traffic between the pair of core routers.

In the entity-level of analysis, the determined utilization metrics over the time series are compared to the standard deviation and ARIMA confidence interval for the time series. Again, the time series in the entity-level of analysis can be constructed separately for each hour of the day over a multi-day (e.g., twenty one days, thirty days, etc.) rolling window. If the utilization metric defined for this level exceeds the standard deviation for the series by a certain factor (either above or below) and falls outside the ARIMA confidence interval for the time series for more than a set period of time (e.g., two days, three days, etc.), the entity identified above (e.g., the ISP AS closest to an originating point of traffic associated with the pair of core routers or an ISP AS closest to the network being considered) can be positively identified as the responsible party for the traffic pattern shift. Again, the use of the set period of time as illustrated and described herein can ensure that any detected traffic changes are not temporary and are long-term changes in traffic. As such, when a pair of routers is marked and/or when an entity is identified as illustrated and described herein, this is the result of only long term traffic changes and not due to temporary spikes in traffic. It should be understood that this example is illustrative, and therefore should not be construed as being limiting in any way.

The traffic monitoring service also can be configured to generate and output information or data that indicates that a traffic pattern shift has occurred and the entities responsible for the traffic pattern shift. In particular, in various embodiments of the concepts and technologies disclosed herein, the traffic monitoring service can be configured to generate traffic shift data that indicates that a traffic pattern shift has occurred (e.g., between a pair of core routers), the identity of the two or more core routers affected by the traffic pattern shift, and the identity of the one or more entities responsible for the traffic pattern shift. The traffic monitoring service can be configured to provide the traffic shift data to a user associated with a management device. The management device or operating group can take one or more actions in response to identifying the traffic pattern shift such as, for example, increasing capacity of one or more core routers, instantiating a new core router, balance loading and/or rerouting of traffic associated with the entity identified as being responsible for the traffic pattern shift, combinations thereof, or the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for using a traffic monitoring service to detect traffic pattern shifts will be described, according to an illustrative embodiment. As will be appreciated with reference to the illustrated and described embodiments disclosed herein, the concepts and technologies disclosed herein are used to ensure that detected traffic pattern shifts are long-term changes to traffic, and short-term traffic changes and/or traffic spikes (e.g., caused by an event or the like) are not acted on, thereby avoiding wasting resources or the like. It should be understood that this example is illustrative, and therefore should not be construed as being limiting in any way. The operating environment 100 shown in FIG. 1 includes multiple core routers 102A-N (hereinafter collectively and/or generically referred to as "core routers 102"), which can operate in communication with and/or as part of a communications network ("network") 104, though this is not necessarily the case in all embodiments. According to various embodiments of the concepts and technologies disclosed herein, the operating environment 100 includes at least two core routers 102, though other numbers of core routers 102 are included in various embodiments of the concepts and technologies disclosed herein.

According to various embodiments of the concepts and technologies disclosed herein, the core routers 102 can be configured to route traffic to, from, and/or across the network 104, with the traffic being generated by and/or being routed to one or more entities 106A-N(hereinafter collectively and/or generically referred to as "entities 106"). According to various embodiments of the concepts and technologies disclosed herein, the entities 106 therefore can correspond to ingress entities originating traffic routed to one or more core routers 102, egress entities receiving traffic routed from one or more core routers 102, and/or other entities that are responsible for traffic associated with the network 104. It should be understood that this example is illustrative, and therefore should not be construed as being limiting in any way.

According to various embodiments of the concepts and technologies disclosed herein, the core routers 102 and/or one or more devices in communication with the network 104 and/or the core routers 102 (e.g., a traffic monitoring device, not illustrated in FIG. 1) can be configured to generate netflow data 108. The netflow data 108 can indicate, for example, devices (e.g., the entities 106) that are generating and/or sending data associated with traffic flowing to and/or through the core routers 102, packet attributes associated with the traffic flowing to and/or through the core routers 102, and/or other aspects of the traffic. Because the netflow data 108 can include other information as generally is understood, it should be understood that these examples are illustrative, and therefore should not be construed as being limiting in any way.

The operating environment 100 also can include a server computer 110, which can operate in communication with and/or as part of the network 104, though this is not necessarily the case in all embodiments. According to various embodiments of the concepts and technologies disclosed herein, the functionality of the server computer 110 may be provided by one or more server computers, other computing systems, or the like. It should be understood that the functionality of the server computer 110 may be provided by a single device, by two or more similar devices, and/or by two or more dissimilar devices. For purposes of describing the concepts and technologies disclosed herein, the server computer 110 is described herein as a server computer. It should be understood that this embodiment is illustrative, and should not be construed as being limiting in any way.

The server computer 110 can execute an operating system (not illustrated in FIG. 1) and one or more application programs such as, for example, a netflow data collector 112, a traffic matrix generator 114, and/or a traffic monitoring service 116. The operating system can include a computer program that can control the operation of the server computer 110. The netflow data collector 112, the traffic matrix generator 114, and the traffic monitoring service 116 can include executable programs that can be configured to execute on top of the operating system to provide various functions as illustrated and described herein.

Although the netflow data collector 112, the traffic matrix generator 114, and the traffic monitoring service 116 are illustrated as separate applications or modules executed by the server computer 110, it should be understood that functionality of the netflow data collector 112 and the traffic matrix generator 114 can be incorporated into the traffic monitoring service 116 and/or embodied as or in stand-alone devices or components thereof operating as part of or in communication with the network 104 and/or the server computer 110. As such, the illustrated embodiment should be understood as being illustrative of only some contemplated embodiments and should not be construed as being limiting in any way.

The netflow data collector 112 can be configured to obtain and analyze netflow data 108. In particular, as shown in FIG. 1, the netflow data collector 112 can be configured to obtain the netflow data 108 from one or more core routers 102 and/or one or more traffic monitoring device associated with and/or operating on the network 104 and/or other networks (e.g., a carrier network). The netflow data 108 can be associated with devices (e.g., the entities 106) connecting to the network 104 through and/or via the core routers 102. The netflow data collector 112 also can be configured to extract data features from the netflow data 108. These features can capture various netflow characteristics associated with the entities 106 such as what entities 106 are connecting to the core routers 102 and/or the network 104 via the core routers 102; traffic bandwidth associated with these and/or other connections to the core routers 102 and/or the network 104; and/or other aspects of the connections between the entities 106 and the core routers 102 and/or the network 104 via the core routers 102. It should be understood that these examples are illustrative, and therefore should not be construed as being limiting in any way.

The traffic matrix generator 114 can be configured to generate, based on the netflow data 108 and routing data 118 obtained from one or more data sources 120, an augmented traffic matrix 122. According to various embodiments, the data sources 120 can include an interface inventory 120A, one or more routing table 120B, and/or other data sources 120. In particular, the traffic matrix generator 114 can be configured to compile the augmented traffic matrix 122 between pairs of core routers 102 over a time period such as a number of days, a number of weeks, a number of months, or the like. The traffic matrix generator 114 can be configured to augment information from the five tuple flows in the netflow data 108 by adding information obtained in the routing data 118. Specifically, the routing data 118 illustrated and described herein can identify neighboring ingress and egress autonomous systems (e.g., a neighboring ingress and egress entity 106), which can be obtained from an interface inventory 120A; and the originating and terminating autonomous systems (e.g., originating and terminating entities 106), which can be determined based on information in a routing table 120B. Because other data can be used to augment the netflow data 108 when generating the augmented traffic matrix, it should be understood that these examples are illustrative, and therefore should not be construed as being limiting in any way.

The traffic monitoring service 116 can be configured to obtain the augmented traffic matrix 122 and perform several levels of analysis on the augmented traffic matrix 122 to identify traffic pattern shifts and entities (e.g., the entities 106) responsible for the traffic pattern shifts. In particular, the traffic monitoring service 116 can be configured select a pair of core routers 102 and determine, for the pair of core routers 102, if traffic between the core routers 102 has shifted in a significant manner (e.g., that the traffic change is a long-term change and not a temporary spike or the like). In particular, the traffic monitoring service 116 can be configured to create, for the pair of core routers 102 (any two core routers 102 that are exchanging traffic) multiple time series that can represent an "router-level utilization," which can be defined herein as a proportion of network traffic that is occurring between the pair of core routers 102 relative to the overall network traffic, for a given time period over a number of days, weeks, or the like. The time series can be determined for one or more, or even each hour of the day over a number of days for which a rolling history is maintained (based on the netflow data 108). Thus, for example, a first time series may represent the proportion of traffic occurring between a particular pair of core routers relative to all network traffic during the 7:00 AM to 8:00 AM hour over two or more days; and a second and/or nth time series may represent the proportion of traffic occurring between a particular pair of core routers relative to all network traffic during the 8:00 AM to 9:00 AM hour over two or more days; or the like It should be understood that this example is illustrative, and therefore should not be construed as being limiting in any way.

After creating multiple time series (a separate time series for each hour of the day) for the pair of core routers 102, the traffic monitoring service 116 can calculate for the pair of core routers 102 a standard deviation for utilization of the pair of core routers 102 and the ARIMA regression confidence interval for each hour of the day over several days, weeks, or the like. The traffic monitoring service 116 can then determine if any of the determined hourly entity-level utilizations for the pair of core routers 102 exceeds the determined standard deviation (either above or below the standard deviation). The traffic monitoring service 116 can also determine if any of the determined hourly utilizations for the pair of core routers 102 is outside of the determined ARIMA confidence interval. If any of the hourly utilizations for the pair of core routers 102 exceeds the standard deviation by a certain factor (either above or below the standard deviation) and falls outside of the ARIMA confidence interval for a defined period of time (e.g., over two or more days, ten days, twenty-one days, or the like), the pair of core routers 102 can be identified as having a long-term traffic pattern shift. It can be appreciated that this level of analysis can correspond to a router-level analysis of the augmented traffic matrix 122, and the result of the router-level analysis can include a pair of core routers 102 that are experiencing a long-term traffic pattern shift. It should be understood that this example is illustrative, and therefore should not be construed as being limiting in any way.

According to various embodiments of the concepts and technologies disclosed herein, for one or more pairs of core routers 102 that are determined as having a long-term traffic pattern shift, the traffic monitoring service 116 can perform an entity-level analysis to identify the entities 106 responsible for the long-term traffic pattern shift. In particular, the traffic monitoring service 116 can be configured to identify an entity (e.g., an Internet services provider ("ISP") autonomous system ("AS")) that is closest to an originating point of traffic associated with the pair of core routers 102, or an ISP AS closest to the network 104 being considered. In the second level analysis (referred to herein as an entity-level analysis), another time series can be constructed. In the entity-level analysis, the time series can be calculated for an entity-level utilization metric, which can be defined as a proportion of traffic between each major entity 106 that is a source of traffic to the destination core router 102 of the pair of core routers 102 identified in the router-level analysis, relative to the total traffic between the pair of core routers 102. It should be understood that this example is illustrative, and therefore should not be construed as being limiting in any way. The determined entity-level utilizations for the time series can be compared to the standard deviation and ARIMA confidence interval for the time series. Again, the time series in the entity-level of analysis can be constructed separately for each hour of the day over a multi-day (e.g., twenty one days, thirty days, etc.) rolling window. If the entity-level utilization exceeds the standard deviation and the ARIMA confidence interval for more than a set period of time (e.g., two days, three days, ten days, etc.), the entity 106 identified above (e.g., the ISP AS closest to an originating point of traffic associated with the pair of core routers 102 or an ISP AS closest to the network 104 being considered) is positively identified as the responsible party for the traffic pattern shift. It should be understood that this example is illustrative, and therefore should not be construed as being limiting in any way.

The traffic monitoring service 116 also can be configured to generate and output information or data that can indicate that a traffic pattern shift has occurred and the entities 106 responsible for the traffic pattern shift. In particular, in various embodiments of the concepts and technologies disclosed herein, the traffic monitoring service 116 can be configured to generate traffic shift data 124 that indicates that a traffic pattern shift has occurred (e.g., between a pair of core routers 102), the identity of the two or more core routers 102 affected by the traffic pattern shift, and the identity of the one or more entity 106 responsible for the traffic pattern shift. The traffic monitoring service 116 can be configured to provide the traffic shift data 124 to a user associated with a management device 126. The management device 126 can take one or more actions in response to identifying the traffic pattern shift such as, for example, increasing capacity of one or more core routers 102, instantiating a new core router 102, balance loading and/or rerouting of traffic associated with the entity 106 identified as being responsible for the traffic pattern shift, combinations thereof, or the like.

FIG. 1 illustrates three core routers 102, three entities 106, one server computer 110, one network 104, and one management device 126. It should be understood, however, that various implementations of the operating environment 100 can include two or more than two core routers 102; one or more than one entity 106; zero, one, or more than one network 104; one or more than one server computer 110; and/or zero, one, or more than one management device 126. As such, the illustrated embodiment should be understood as being illustrative, and should not be construed as being limiting in any way.

Figure 2:
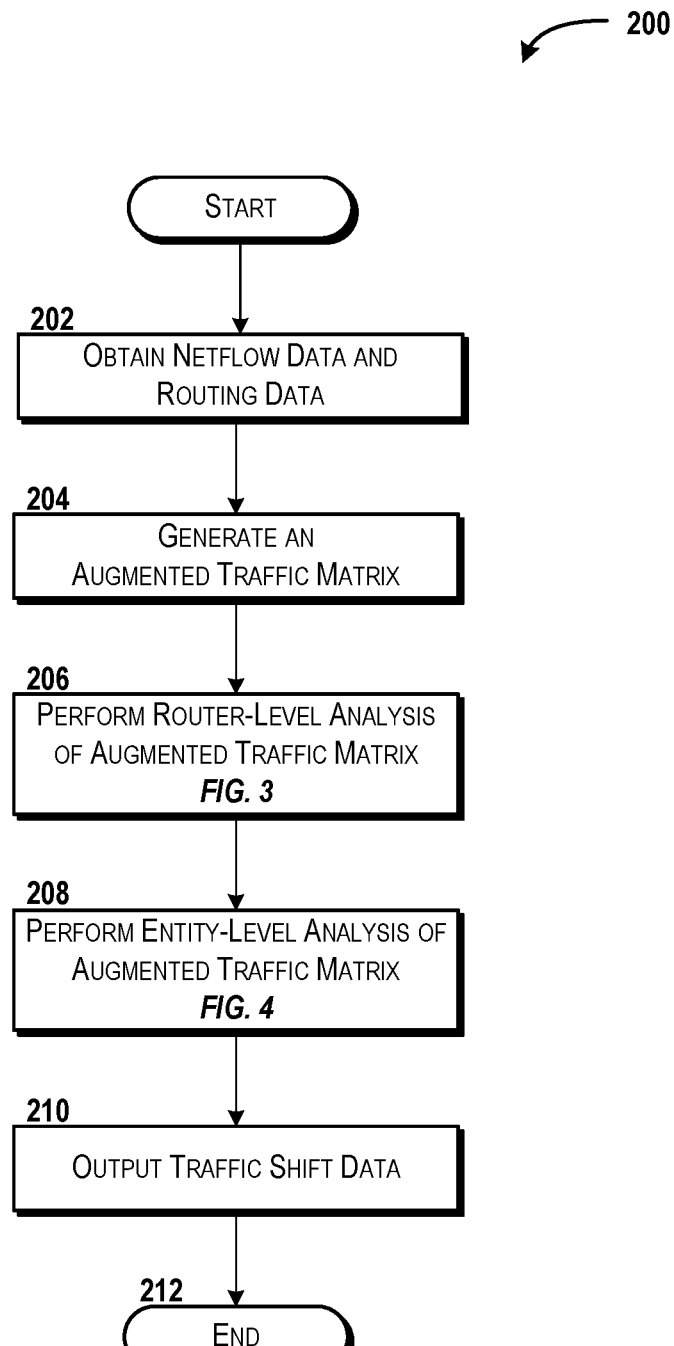
FIG. 2 is a flow diagram showing aspects of a method for identifying long-term traffic pattern shifts and entities responsible for the traffic pattern shifts, according to an illustrative embodiment of the concepts and technologies described herein.

Turning now to FIG. 2, aspects of a method 200 for identifying long-term traffic pattern shifts and entities responsible for the traffic pattern shifts will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 110, to perform one or more operations and/or causing the processor to direct other components of the computing system or device to perform one or more of the operations.

For purposes of illustrating and describing the concepts of the present disclosure, the method 200 is described herein as being performed by the server computer 110 via execution of one or more software modules such as, for example, the traffic monitoring service 116. It should be understood that additional and/or alternative devices and/or network nodes can provide the functionality described herein via execution of one or more modules, applications, and/or other software including, but not limited to, the traffic monitoring service 116. Thus, the illustrated embodiments are illustrative, and should not be viewed as being limiting in any way.

The method 200 begins at operation 202. At operation 202, the server computer 110 can obtain netflow data 108 and routing data 118. As explained above, the server computer 110 can be configured to collect or otherwise obtain the netflow data 108 associated with one or more core routers 102 using a netflow data collector 112, in some embodiments. The netflow data 108 can be obtained by the server computer 110 directly from the core routers 102, in some embodiments, while in some other embodiments, a network monitoring device can be configured to generate the netflow data 108 and to provide the netflow data 108 to the server computer 110. Because the netflow data 108 can be generated by other devices, and because the server computer 110 can be configured to obtain the netflow data 108 in additional and/or alternative manners, it should be understood that the above examples are illustrative, and therefore should not be construed as being limiting in any way.

Similarly, the server computer 110 can be configured to collect or otherwise obtain the routing data 118 from one or more data sources 120 such as, for example, an interface inventory 120A, a routing table 120B, and/or other entities. Because the routing data 118 can be obtained from other entities, it should be understood that this example is illustrative, and therefore should not be construed as being limiting in any way.

From operation 202, the method 200 can proceed to operation 204. At operation 204, the server computer 110 can generate, using the data obtained in operation 202, an augmented traffic matrix such as the augmented traffic matrix 122 illustrated and described above with reference to FIG. 1. In particular, the server computer 110 can be configured, e.g., via execution of the traffic matrix generator 114, to generate, based on the netflow data 108 and routing data 118 obtained from the one or more data sources 120, the augmented traffic matrix 122.

According to various embodiments, the server computer 110 (e.g., via execution of the traffic matrix generator 114) can be configured to compile the augmented traffic matrix 122 between pairs of core routers 102 for a specified time period. The server computer 110 can be configured to augment information from the five tuple flows in the netflow data 108 by adding information obtained in the routing data 118. Specifically, the routing data 118 can identify neighboring ingress and egress autonomous systems (e.g., a neighboring ingress and egress entity 106) for traffic. This information can be obtained from an interface inventory 120A in some embodiments. The routing data 118 also can include originating and terminating autonomous systems (e.g., originating and terminating entities 106), which can be determined based on information in a routing table 120B. Because other data can be used to augment the netflow data 108 when generating the augmented traffic matrix 122, it should be understood that these examples are illustrative, and therefore should not be construed as being limiting in any way.

From operation 204, the method 200 can proceed to operation 206. At operation 206, the server computer 110 can perform a router-level analysis of the augmented traffic matrix 122. In particular, in the router-level analysis, the traffic monitoring service 116 can be configured to create, for a selected pair of core routers 102 (any two core routers 102 that are exchanging traffic) a number of time series that can represent a proportion of network traffic that is occurring between the pair of core routers 102 relative to the overall network traffic. The number of time series can be determined for each hour of the day over a number of days for which a rolling history is maintained (based on the netflow data 108). Thus, it can be appreciated that in some embodiments twenty-four time series may be created, with these time series representing the router-level utilizations (defined herein as the proportion of network traffic occurring between the pair of core routers 102 relative to all network traffic) for the pair of core routers 102 over each hour of the day over two or more days, weeks, and/or other defined time periods. It should be understood that this example is illustrative, and therefore should not be construed as being limiting in any way.

The server computer 110 can analyze the time series for the pair of core routers 102 and calculate for the pair of core routers 102 a standard deviation for router-level utilization of the pair of core routers 102 and the ARIMA regression confidence interval for the router-level utilizations, i.e., the proportions of traffic between the pair of routers relative to all network traffic. The server computer 110 can determine if any of the determined router-level utilizations for the pair of core routers 102 for the one or more time series exceeds the determined standard deviation (either above or below the standard deviation). The server computer 110 can also determine if any of the determined router-level utilizations for the pair of core routers 102 for the one or more time series is outside of the determined ARIMA confidence interval. If the server computer 110 determines, for the pair of core routers 102, that the router-level utilizations for the pair of core routers 102 exceeds the standard deviation (either above or below the standard deviation) and falls outside of the ARIMA confidence interval, the pair of core routers 102 can be identified as having a long-term traffic pattern shift. Additional details of the router-level analysis will be illustrated and described in more detail hereinbelow with reference to FIG. 3.

From operation 206, the method 200 can proceed to operation 208. At operation 208, the server computer 110 can perform an entity-level analysis of the augmented traffic matrix 122. In particular, the server computer 110 can perform, for one or more pairs of core routers 102 that are determined during the router-level analysis of operation 206 as having a long-term traffic pattern shift, an entity-level analysis to identify the entities 106 responsible for the long-term traffic pattern shift. In particular, the server computer 110 (e.g., via execution of the traffic monitoring service 116) can be configured to identify an entity 106 (e.g., an ISP AS) that is closest to an originating point of traffic associated with the pair of core routers 102, or an ISP AS closest to the network 104 being considered.

The server computer 110 can consider the proportion of traffic being routed to the pair of core routers 102 by the selected entity 106 relative to all traffic associated with the pair of core routers 102. This proportion is referred to herein as the "entity-level utilization" and this entity-level utilization can be modeled in another time series for each hour of the day. These entity-level utilizations again can be compared to the standard deviation and ARIMA confidence interval. If the utilization exceeds the standard deviation and the ARIMA confidence interval for more than a set period of time (e.g., two days, three days, etc.), the entity 106 identified above (e.g., the ISP AS closest to an originating point of traffic associated with the pair of core routers 102 or an ISP AS closest to the network 104 being considered) can be positively identified as the responsible party for the traffic pattern shift. It should be understood that this example is illustrative, and therefore should not be construed as being limiting in any way. Additional details of the entity-level analysis will be illustrated and described in more detail hereinbelow with reference to FIG. 4.

From operation 208, the method 200 can proceed to operation 210. At operation 210, the server computer 110 can output traffic shift data 124. In particular, the server computer 110 can generate and output information or data that indicates that a traffic pattern shift has occurred and the entities 106 responsible for the traffic pattern shift as the traffic shift data 124. The traffic shift data 124 can indicate that a traffic pattern shift has occurred (e.g., between a pair of core routers 102), the identity of the two or more core routers 102 affected by the traffic pattern shift, and the identity of the one or more entity 106 responsible for the traffic pattern shift. The server computer 110 can be configured to provide the traffic shift data 124 to a user associated with a management device 126. The management device 126 can take one or more actions in response to identifying the traffic pattern shift such as, for example, increasing capacity of one or more core routers 102, instantiating a new core router 102, balance loading and/or rerouting of traffic associated with the entity 106 identified as being responsible for the traffic pattern shift, combinations thereof, or the like. It should be understood that this example is illustrative, and therefore should not be construed as being limiting in any way.

From operation 210, the method 200 can proceed to operation 212. The method 200 can end at operation 212.

Figure 3:
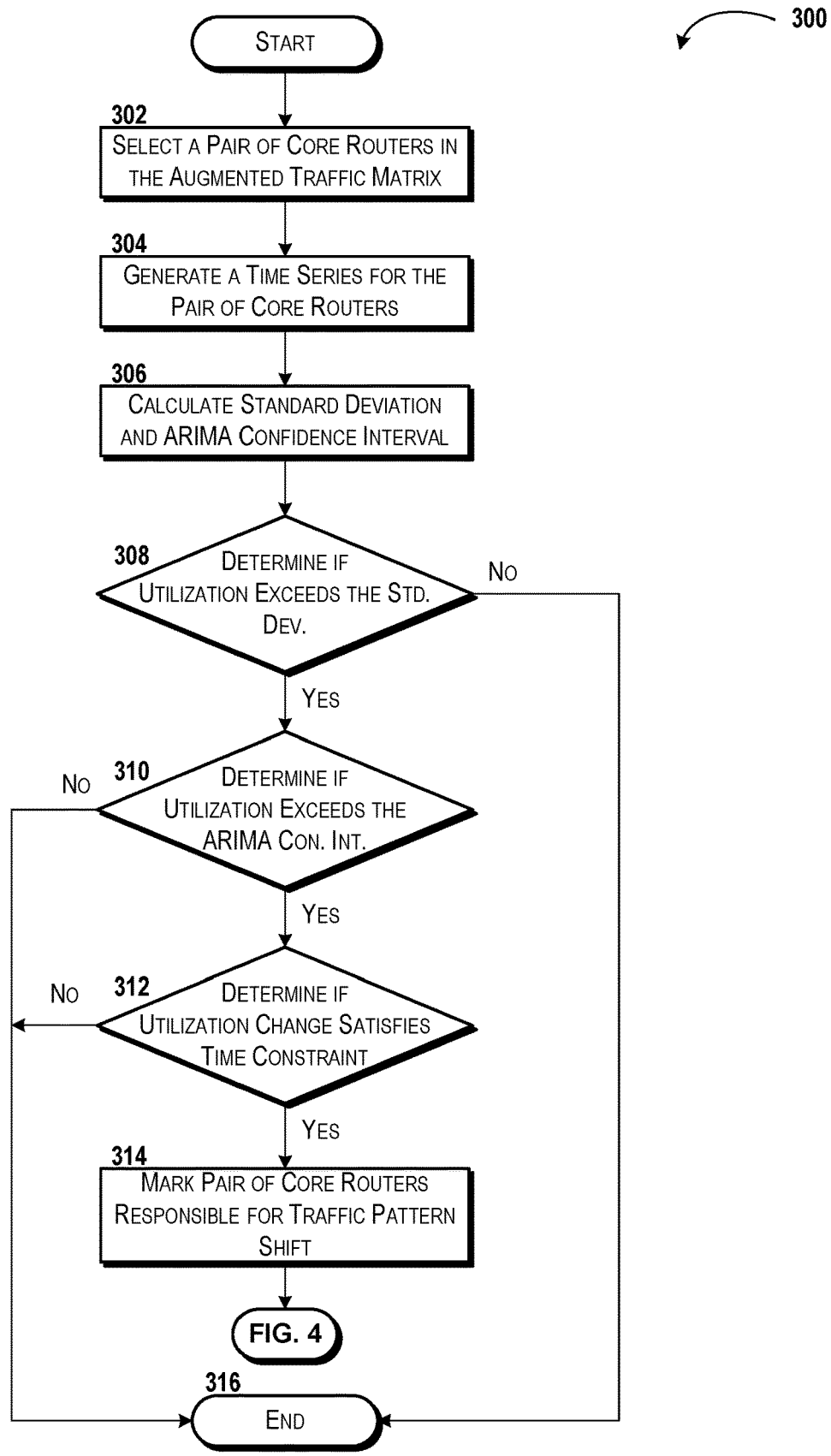
FIG. 3 is a flow diagram showing aspects of a method for performing router-level analysis to identify long-term traffic pattern shifts, according to an illustrative embodiment of the concepts and technologies described herein.

Turning now to FIG. 3, aspects of a method 300 for performing router-level analysis to identify long-term traffic pattern shifts will be described in detail, according to an illustrative embodiment. For purposes of illustrating and describing the concepts of the present disclosure, the method 300 is described herein as being performed by the server computer 110 via execution of one or more software modules such as, for example, the traffic monitoring service 116. It should be understood that additional and/or alternative devices and/or network nodes can provide the functionality described herein via execution of one or more modules, applications, and/or other software including, but not limited to, the traffic monitoring service 116. Thus, the illustrated embodiments are illustrative, and should not be viewed as being limiting in any way.

The method 300 begins at operation 302. At operation 302, the server computer 110 can select a pair of core routers 102 in the augmented traffic matrix 122. According to various embodiments of the concepts and technologies disclosed herein, the server computer 110 can select any pair of core routers 102 between which traffic is exchanged in operation 202. It can be appreciated that the router-level analysis illustrated and described in FIG. 3 can be iterated and/or looped for each pair of core routers 102 in some embodiments, i.e., until all core routers 102 are considered, if desired. As such, various considerations can guide which pair of core routers 102 is being considered in a particular iteration of operation 302 such as a most utilized pair of core routers 102, or the like. It should be understood that this example is illustrative, and therefore should not be construed as being limiting in any way.

From operation 302, the method 300 can proceed to operation 304. At operation 304, the server computer 110 can generate a number of time series that can represent router-level utilizations for the pair of core routers 102 selected in operation 302 over a time period. As noted above, the router-level utilization can be defined as a proportion of network traffic that is occurring between the pair of core routers 102 relative to the overall network traffic. The time period can be defined by preferences, settings, or the like. In some embodiments, the netflow data 108 and the routing data 118 can be obtained for a rolling time period (e.g., three days, five days, ten days, or the like) and can be maintained on a rolling basis (e.g., applying a first-in-first-out ("FIFO") data retention model, or the like). Thus, the multiple time series can be generated, in some embodiments, with data points for router-level utilizations for the pair of core routers 102 on an hourly basis (e.g., for hours of the day) over the specified time period such as a number of days, weeks, or the like. Thus, in some embodiments the server computer 110 can generate twenty-four time series for the router-level utilizations (one time series for each hour of the day over several days or weeks or the like). It should be understood that this example is illustrative, and therefore should not be construed as being limiting in any way.

From operation 304, the method 300 can proceed to operation 306. At operation 306, the server computer 110 can calculate, for the time series generated in operation 304, a standard deviation for router-level utilizations of the pair of core routers 102. The server computer 110 also can generate, in operation 306, an ARIMA confidence interval for the utilization of the pair of core routers 102. It can be appreciated that the server computer 110 also can be configured to calculate, as part of the calculation of standard deviation, an average or mean utilization for the pair of core routers 102. It should be understood that this example is illustrative, and therefore should not be construed as being limiting in any way.

From operation 306, the method 300 can proceed to operation 308. At operation 308, the server computer 110 can determine, for router-level utilization of the pair of core routers 102 in the time series, if the router-level utilization exceeds the standard deviation calculated in operation 306. It can be appreciated that a router-level utilization that falls under the average utilization by more than some factor times the standard deviation can be determined to exceed the standard deviation. The factor can be defined by settings, configurations, or the like. Similarly, it can be appreciated that an hourly utilization that exceeds the average utilization by more than some factor times the standard deviation can be determined to exceed the standard deviation.

If the server computer 110 determines, in operation 308, that one or more hourly utilizations of the pair of core routers 102 exceeds some factor times the standard deviation calculated in operation 306, the method 300 can proceed to operation 310. At operation 310, the server computer 110 can determine, for each hourly utilization of the pair of core routers 102, if the router-level utilization falls outside of the ARIMA confidence interval calculated in operation 306. In some embodiments, the server computer 110 can determine in operation 306 if the router-level utilization exceeds some factor times the ARIMA confidence interval. It should be understood that this example is illustrative, and therefore should not be construed as being limiting in any way.

If the server computer 110 determines, in operation 310, that one or more router-level utilizations of the pair of core routers 102 for a particular hour represented by the time series falls outside of the ARIMA confidence interval calculated in operation 306, the method 300 can proceed to operation 312. At operation 312, the server computer 110 can determine if the change in router-utilization for the pair of core routers 102 satisfies a time constraint. In various embodiments, the time constraint can be defined as a number of days, a number of weeks, or the like. Thus, in operation 312, the server computer 110 can determine if any change in the router-level utilization for the pair of core routers 102 at a particular hour represented by the time series that exceeds the standard deviation and falls outside of the ARIMA confidence interval has occurred a specified number of times over a specified time period (e.g., every day in hour five over three days; over a majority of days for a week or weeks; or the like).

If the server computer 110 determines, in operation 312, that the change in the router-level utilization for the pair of core routers 102 satisfies the defined time constraint, the method 300 can proceed to operation 314. At operation 314, the server computer 110 can mark the pair of core routers 102 selected in operation 302 as being responsible for and/or involved in a statistically significant and/or long-term traffic pattern shift. From operation 314, the method can proceed to the functionality illustrated and described below with reference to FIG. 4 and an entity-level analysis can be performed on the marked pair of core routers 102. It should be understood that this example is illustrative, and therefore should not be construed as being limiting in any way.

If the server computer 110 determines, in operation 308 that no router-level utilizations of a time series for the pair of core routers 102 exceeds some factor times the standard deviation calculated in operation 306, the method 300 can proceed to operation 316. The method 300 also can proceed to operation 316 from operation 310 if the server computer 110 determines, in operation 310, that no router-level utilizations of the time series for the pair of core routers 102 falls outside of the ARIMA confidence interval (or some factor times the ARIMA confidence interval) calculated in operation 306. The method 300 also can proceed to operation 316 from operation 312 if the server computer 110 determines, in operation 312, that the change in utilization for the pair of core routers 102 does not satisfy a time constraint. The method 300 can end at operation 316.

In some embodiments, as noted above, the method 300 can, instead of ending at operation 316, return to operation 302 to select a next pair of core routers 102 and the method 300 can be iterated until all pairs of core routers 102 have been considered. Thus, it should be understood that the illustrated embodiment is illustrative and should not be construed as being limiting in any way.

Figure 4:
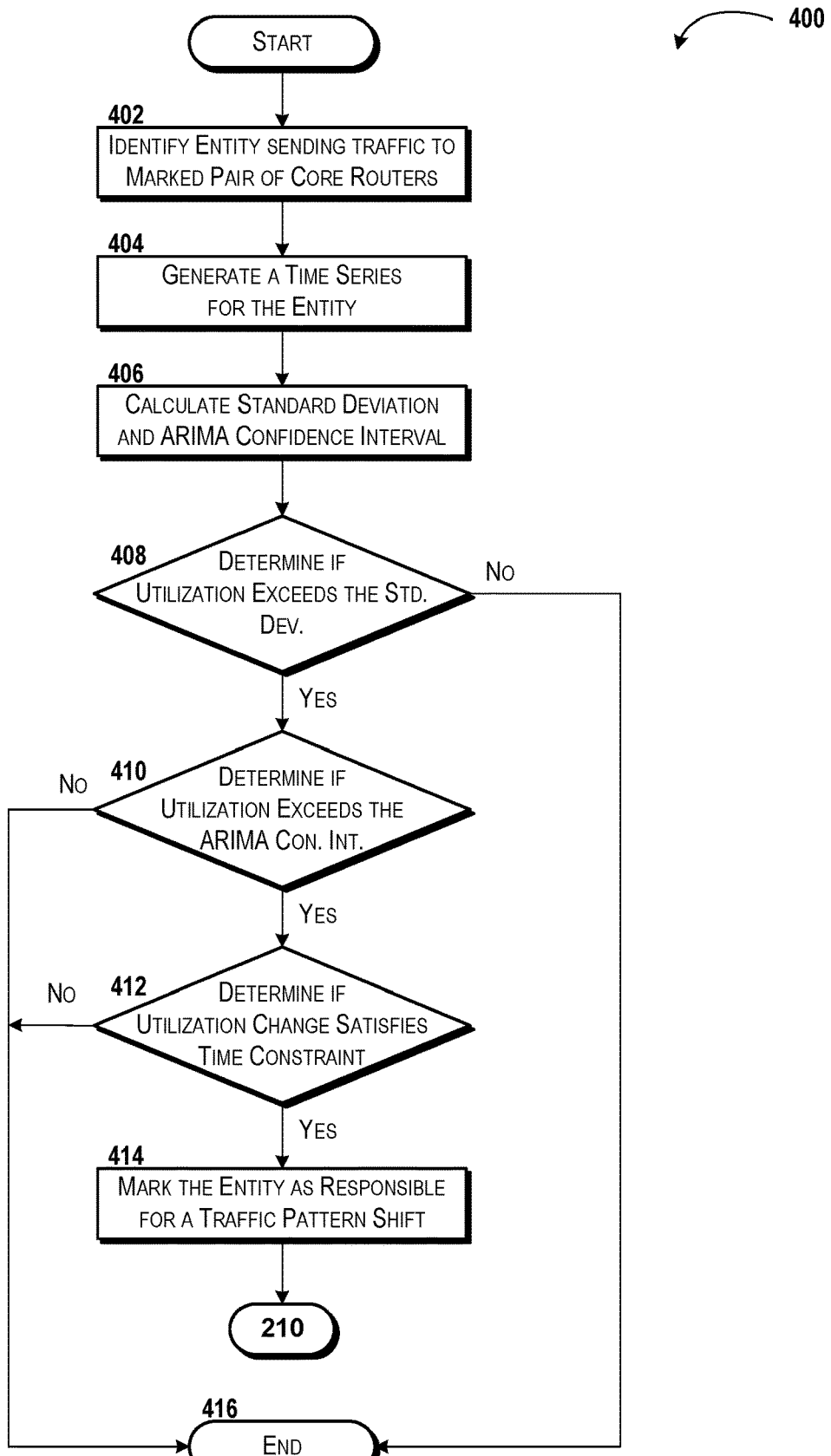
FIG. 4 is a flow diagram showing aspects of a method for performing entity-level analysis to identify entities responsible for long-term traffic pattern shifts, according to an illustrative embodiment of the concepts and technologies described herein.

Turning now to FIG. 4, aspects of a method 400 for performing entity-level analysis to identify entities responsible for long-term traffic pattern shifts will be described in detail, according to an illustrative embodiment. For purposes of illustrating and describing the concepts of the present disclosure, the method 400 is described herein as being performed by the server computer 110 via execution of one or more software modules such as, for example, the traffic monitoring service 116. It should be understood that additional and/or alternative devices and/or network nodes can provide the functionality described herein via execution of one or more modules, applications, and/or other software including, but not limited to, the traffic monitoring service 116. Thus, the illustrated embodiments are illustrative, and should not be viewed as being limiting in any way.

At operation 402, the server computer 110 can select a marked pair of core routers 102 in the augmented traffic matrix 122, e.g., a pair of core routers 102 that have been identified in any iteration of the method 300 illustrated and described above with reference to FIG. 3 as being associated with and/or responsible for a statistically significant shift in traffic (e.g., a long-term shift in traffic and not a temporary, short-term, event-driven, or the other short-lived traffic shift). According to various embodiments of the concepts and technologies disclosed herein, the server computer 110 can select any pair of core routers 102 that has been marked as being associated with and/or responsible for a statistically significant shift in traffic. It can therefore be appreciated that the entity-level analysis illustrated and described in FIG. 4 can be iterated and/or looped for each marked pair of core routers 102 that is associated with a traffic shift, if desired. It should be understood that this example is illustrative, and therefore should not be construed as being limiting in any way.

From operation 402, the method 400 can proceed to operation 404. At operation 404, the server computer 110 can generated another time series (for one or more or each hour over a number of days, weeks, or the like) for the marked pair of core routers 102 selected in operation 402 and one or more entities 106. The time period for the time series generated in operation 404 can be defined by preferences, settings, or the like, as explained above, and the time series can be generated for entity-level utilizations associated with a particular entity 106. As used herein, an "entity-level utilization" can be defined herein as referring to the proportion of traffic between a particular entity 106 that is a source of traffic to the destination core router 102 of the pair of core routers 102 identified in the router-level of analysis, relative to the total traffic between the pair of core routers 102. The time series can be generated, in some embodiments, with data points representing the entity-level utilizations on an hourly basis over the specified time period such as a number of days, a number of weeks, or the like. As part of generating the time series in operation 404, the server computer 110 can identify an entity 106 (e.g., an ISP AS) that is closest (among all ISP AS's associated with the network 104) to an originating point of traffic associated with the pair of core routers 102, in some embodiments. In some other embodiments, the server computer 110 can identify, as part of operation 404, an ISP AS that is closest to the network 104 being considered (closest of multiple ISP AS's). Operation 404 also can include the server computer 110 modeling another time series for the pair of core routers 102.

From operation 404, the method 400 can proceed to operation 406. At operation 406, the server computer 110 can calculate, for the time series generated in operation 404, a standard deviation for entity-level utilizations for the pair of core routers 102 on an hourly basis over the number of days for traffic relating to the entity 106 identified as part of operation 404. The server computer 110 also can generate, in operation 406, an ARIMA confidence interval for the entity-level utilizations for the time series for the pair of core routers 102 and the entity 106. It can be appreciated that the server computer 110 also can be configured to calculate, as part of the calculation of standard deviation, an average or mean utilization for the pair of core routers 102 for traffic relating to the entity 106 identified in operation 404. It should be understood that this example is illustrative, and therefore should not be construed as being limiting in any way.

From operation 406, the method 400 can proceed to operation 408. At operation 408, the server computer 110 can determine, for each entity-level utilization represented in the time series for the pair of core routers 102 for traffic associated with the entity 106 identified in operation 404, if the entity-level utilization exceeds some factor times the standard deviation calculated in operation 406. It can be appreciated that an entity-level utilization that falls under the average utilization by more than some factor times the standard deviation can be determined to exceed the standard deviation. Similarly, it can be appreciated that an entity-level utilization that exceeds the average utilization by more than some factor times the standard deviation can be determined to exceed the standard deviation. It should be understood that this example is illustrative, and therefore should not be construed as being limiting in any way.

If the server computer 110 determines, in operation 408, that one or more entity-level utilizations of the time series for the pair of core routers 102 for traffic associated with the entity 106 identified in operation 404 exceeds some factor times the standard deviation calculated in operation 406, the method 400 can proceed to operation 410. At operation 410, the server computer 110 can determine, for each entity-level utilization of the pair of core routers 102, if the entity-level utilization of the pair of core routers 102 for traffic associated with the entity 106 identified in operation 404 falls outside of the ARIMA confidence interval calculated in operation 406.

If the server computer 110 determines, in operation 410, that one or more entity-level utilizations of the time series for the pair of core routers 102 for traffic associated with the entity 106 identified in operation 404 falls outside of the ARIMA confidence interval (or some factor times the ARIMA confidence interval such as ninety-five percent or the like) calculated in operation 406, the method 400 can proceed to operation 412. At operation 412, the server computer 110 can determine if the change in the entity-level utilization for the pair of core routers 102 for traffic associated with the entity 106 identified in operation 404 satisfies a time constraint. It can be appreciated that the use of the time constraint can be included to ensure that any detected traffic changes are associated only with long-term traffic shifts and not with temporary, event-driven, and/or other short-term traffic spikes. It should be understood that this example is illustrative, and therefore should not be construed as being limiting in any way.

In various embodiments, the time constraint can be defined as a number of days, a number of weeks, or the like. Thus, in operation 412, the server computer 110 can determine if any change in entity-level utilization for the pair of core routers 102 for traffic associated with the entity identified in operation 404 exceeds some factor times the standard deviation and falls outside of the ARIMA confidence interval (or some factor times the ARIMA confidence interval) has occurred a specified number of times over a specified time period (e.g., in a particular hour over two or more days, five or more days, ten or more days, or the like).

If the server computer 110 determines, in operation 412, that the change in entity-level utilization of the time series for the pair of core routers 102 for traffic associated with the entity 106 determined in operation 404 satisfies a time constraint, the method 400 can proceed to operation 414. At operation 414, the server computer 110 can mark the entity 106 identified in operation 404 as being responsible for and/or involved in a statistically significant and/or long-term traffic pattern shift. From operation 414, the method can proceed to the functionality illustrated and described above with reference to operation 210 of the method 200 illustrated and described above with reference to FIG. 2. It should be understood that this example is illustrative, and therefore should not be construed as being limiting in any way.

If the server computer 110 determines, in operation 408 that no entity-level utilization of the time series for the pair of core routers 102 for traffic associated with the entity 106 identified in operation 404 exceeds some factor times the standard deviation calculated in operation 406, the method 400 can proceed to operation 416. The method 400 also can proceed to operation 416 from operation 410 if the server computer 110 determines, in operation 410, that no entity-level utilization of the time series for the pair of core routers 102 for traffic associated with the entity 106 identified in operation 404 falls outside of the ARIMA confidence interval (or some factor times the ARIMA confidence interval) calculated in operation 406. The method 400 also can proceed to operation 416 from operation 412 if the server computer 110 determines, in operation 412, that the change in utilization for the pair of core routers 102 for traffic associated with the entity 106 identified in operation 404 does not satisfy a time constraint. The method 400 can end at operation 416.

In some embodiments, as noted above, the method 400 can, instead of ending at operation 416, return to operation 402 to select a next pair of marked core routers 102 and the method 400 can be iterated until all marked pairs of core routers 102 have been considered. Thus, it should be understood that the illustrated embodiment is illustrative and should not be construed as being limiting in any way.

In some embodiments of the concepts and technologies disclosed herein, the router-level analysis and/or the entity-level analysis can be performed in additional and/or alternative manners. For example, although the above description has referred to creating time series for router-level utilizations and/or entity-level utilizations for a particular hour over two or more days, it should be understood that a particular hour on one day may correspond to a different hour on a second day (e.g., the 9:00-10:00 AM hour on Monday may correspond more to the 10:00-11:00 AM hour on Tuesday than the 9:00-10:00 AM hour on Tuesday). As such, the concepts and technologies disclosed herein can be used to evaluate different hours of the day for separate daily time series constructed for each particular hour of the day in some embodiments. It should be understood that this example is illustrative, and therefore should not be construed as being limiting in any way.

Additionally, it should be understood that for a given pair of core routers 102 being analyzed at a particular time, the pair of core routers 102 can be analyzed in both directions (e.g., from a first core router 102A to a second core router 102B and from the second core router 102B to the first core router 102A). It should be understood that this example is illustrative, and therefore should not be construed as being limiting in any way.

Figure 5:
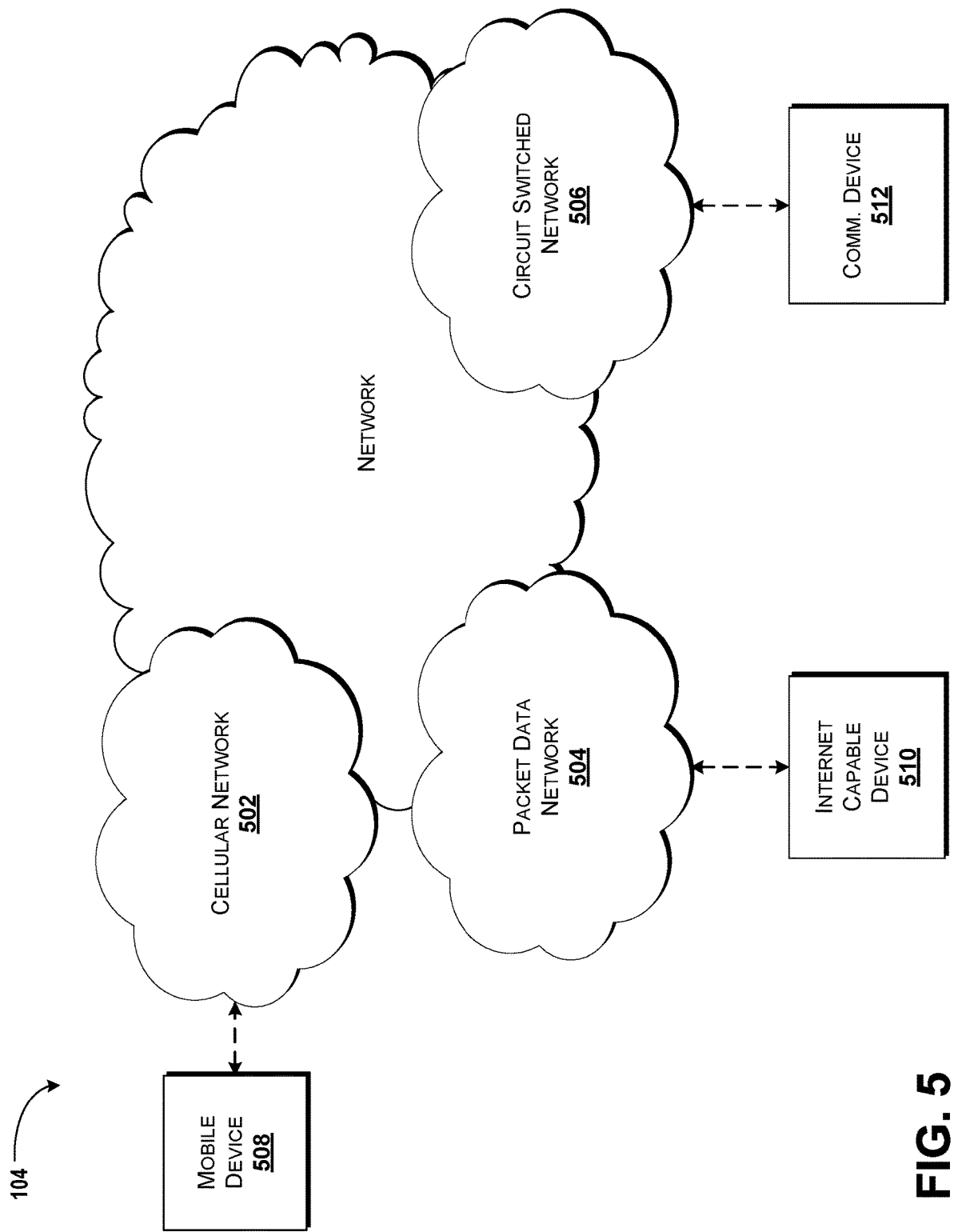
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards, 5G mobile communications standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
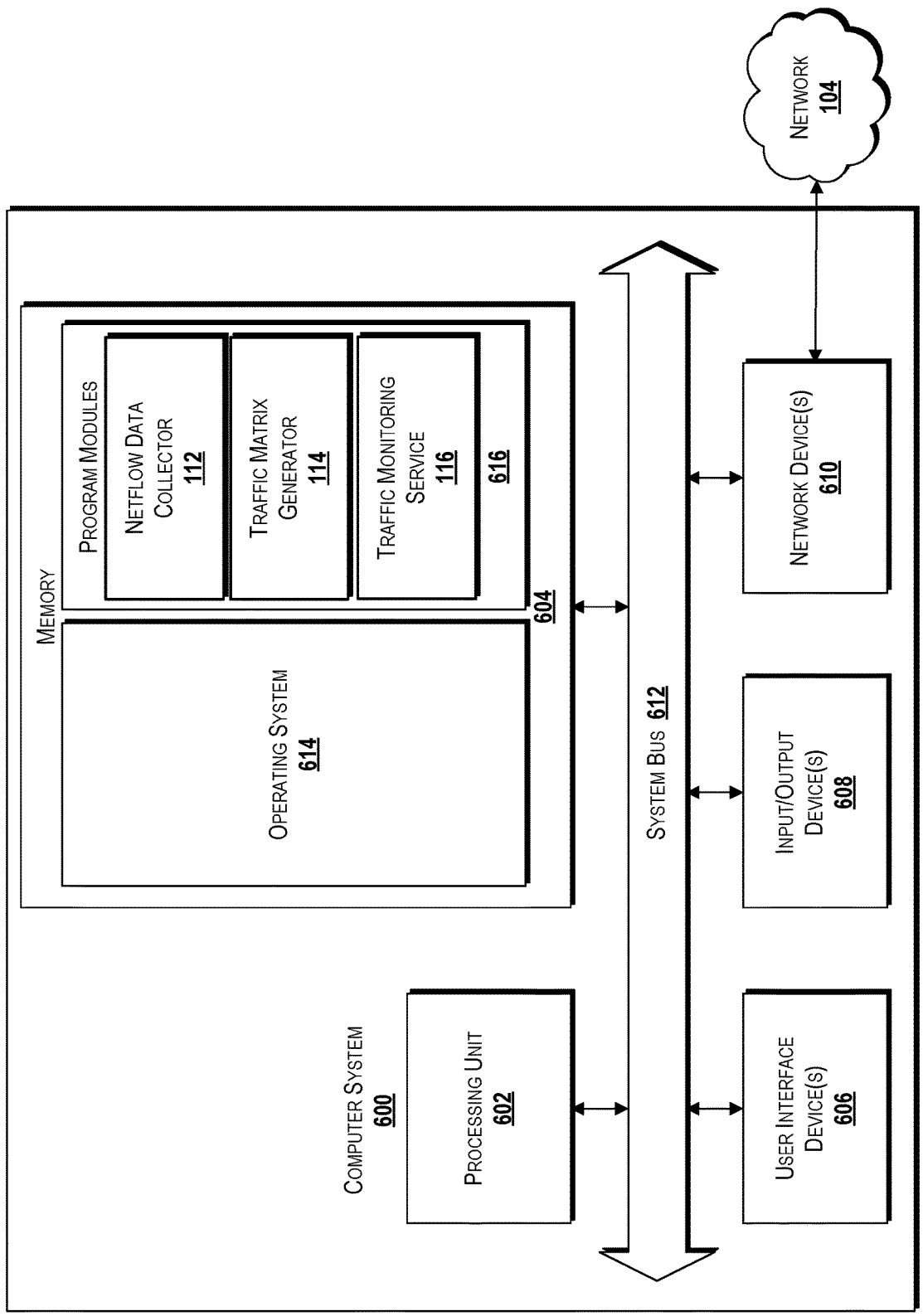
FIG. 6 is a block diagram illustrating an example computer system configured to provide and/or interact with a traffic monitoring service, according to some illustrative embodiments of the concepts and technologies described herein.

FIG. 6 is a block diagram illustrating a computer system 600 configured to provide the functionality described herein for using a traffic monitoring service to detect traffic pattern shifts, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the netflow data collector 112, the traffic matrix generator 114, and/or the traffic monitoring service 116. These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the netflow data 108, the routing data 118, the interface inventory 120A, the routing table 120B, the augmented traffic matrix 122, the traffic shift data 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
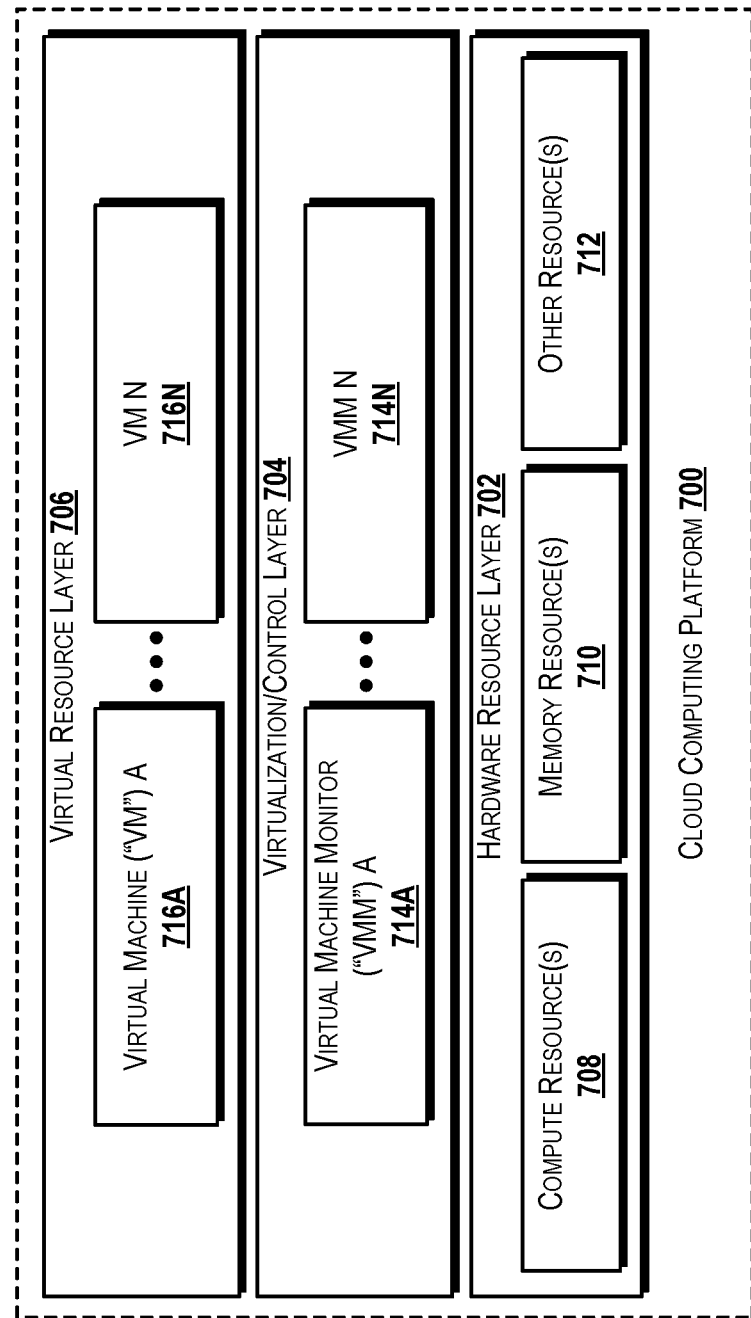
FIG. 7 is a diagram illustrating a computing environment capable of implementing aspects of the concepts and technologies disclosed herein, according to some illustrative embodiments of the concepts and technologies described herein.

FIG. 7 illustrates an illustrative architecture for a cloud computing platform 700 that can be capable of executing the software components described herein for using a traffic monitoring service to detect traffic pattern shifts and/or for interacting with the netflow data collector 112, the traffic matrix generator 114, and/or the traffic monitoring service 116. Thus, it can be appreciated that in some embodiments of the concepts and technologies disclosed herein, the cloud computing platform 700 illustrated in FIG. 7 can be used to provide the functionality described herein with respect to the core routers 102, the entities 106, the server computer 110, the data sources 120, and/or the management device 128.

The cloud computing platform 700 thus may be utilized to execute any aspects of the software components presented herein. Thus, according to various embodiments of the concepts and technologies disclosed herein, the netflow data collector 112, the traffic matrix generator 114, and/or the traffic monitoring service 116 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the netflow data collector 112, the traffic matrix generator 114, and/or the traffic monitoring service 116 illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, California, and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the netflow data collector 112, the traffic matrix generator 114, the traffic monitoring service 116, and/or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the netflow data 108, the routing data 118, the interface inventory 120A, the routing table 120B, the augmented traffic matrix 122, the traffic shift data 124, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for using a traffic monitoring service to detect traffic pattern shifts have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations, the operations comprising:
obtaining netflow data for a plurality of core routers associated with a network and routing data associated with the plurality of core routers, the routing data being obtained from an interface inventory and a routing table;
generating, based on the netflow data and the routing data, an augmented traffic matrix;
performing, on the augmented traffic matrix, a router-level analysis to identify, among the plurality of core routers, a pair of core routers that are associated with a traffic pattern shift in the network, wherein the router-level analysis comprises:
selecting, from the plurality of core routers, the pair of core routers;
generating a daily time series for the pair of core routers, the daily time series comprising router-level utilizations of the pair of core routers for a particular hour of a day, wherein the router-level utilizations of the pair of core routers comprise proportions of traffic between the pair of core routers relative to all traffic in the network;
calculating a standard deviation and an autoregressive integrated moving average confidence interval for the router-level utilizations of the pair of core routers;
determining if, for the daily time series for the particular hour of the day, an hourly router-level utilization of the pair of core routers exceeds the standard deviation from an average utilization for the pair of core routers by a specified factor;
if a determination is made that the hourly router-level utilization of the pair of core routers exceeds the standard deviation from the average utilization for the pair of core routers by the specified factor, determining if the hourly router-level utilization of the pair of core routers exceeds the autoregressive integrated moving average confidence interval for the utilizations of the pair of core routers; and if a determination is made that the hourly router-level utilization of the pair of core routers exceeds the autoregressive integrated moving average confidence interval for the utilizations of the pair of core routers, marking the pair of core routers as responsible for the traffic pattern shift in the network;

performing, on the pair of core routers, an entity-level analysis to identify, among a plurality of entities, an entity that is responsible for the traffic pattern shift in the network; and outputting traffic shift data that identifies the pair of core routers and the entity that is responsible for the traffic pattern shift in the network.

2. The system of claim 1, wherein the entity-level analysis comprises:

selecting, from a plurality of entities between the pair of core routers, entities that are a major source of traffic to the pair of core routers;

calculating an entity-level utilization for the entity, wherein the entity-level utilization comprises a proportion of traffic between the entity and a destination core router of the pair of core routers relative to all traffic between the pair of core routers;

generating a daily time series for the plurality of entities between the pair of core routers, the daily time series comprising entity-level utilizations between an entity of the plurality of entities and the pair of core routers for a particular hour of the day;

calculating a standard deviation and an autoregressive integrated moving average confidence interval for the utilizations of the pair of core routers for the traffic associated with the entity and the pair of core routers;

determining if an hourly utilization of the pair of core routers exceeds the standard deviation from an average utilization for the pair of core routers for the traffic associated with the entity;

if a determination is made that the hourly utilization of the pair of core routers for the traffic associated with the entity exceeds the standard deviation from the average utilization for the pair of core routers, determining if the hourly utilization of the pair of core routers for the traffic associated with the entity exceeds the autoregressive integrated moving average confidence interval for the utilizations of the pair of core routers; and if a determination is made that the hourly utilization of the pair of core routers for the traffic associated with the entity exceeds the autoregressive integrated moving average confidence interval for the utilizations of the pair of core routers, determining that the entity is responsible for the traffic pattern shift in the network.

3. The system of claim 1, wherein the computer-executable instructions, when executed by the processor, cause the processor to perform operations further comprising:

determining if the traffic pattern shift satisfies a time constraint; and in response to determining that the traffic pattern shift satisfies the time constraint, outputting the traffic shift data.

4. The system of claim 1, wherein the netflow data and the routing data are stored for a rolling time period comprising a number of days, and wherein a first-in-first-out model is used for storing the netflow data and the routing data.

5. The system of claim 1, wherein the entity comprises an Internet service provider autonomous system that is closest, among a plurality of Internet service provider autonomous systems, to an originating point of traffic associated with the pair of core routers.

6. The system of claim 1, wherein the entity comprises an Internet service provider autonomous system that is closest, among a plurality of Internet service provider autonomous systems, to the network.

7. The system of claim 1, wherein the operations further comprise repeating the selecting, the generating the daily time series, the calculating, and the determining for each pair of core routers in the plurality of core routers.

8. The system of claim 7, wherein the operations further comprise selecting, after the repeating, as the pair of core routers, one pair of the each pair of core routers for which a utilization is highest.

9. A method comprising:

obtaining, at a computer comprising a processor, netflow data for a plurality of core routers associated with a network and routing data associated with the plurality of core routers, the routing data being obtained from an interface inventory and a routing table;

generating, by the processor and based on the netflow data and the routing data, an augmented traffic matrix;

performing, by the processor and on the augmented traffic matrix, a router-level analysis to identify, among the plurality of core routers, a pair of core routers that are associated with a traffic pattern shift in the network, wherein the router-level analysis comprises:

selecting, from the plurality of core routers, the pair of core routers;

generating a daily time series for the pair of core routers, the daily time series comprising router-level utilizations of the pair of core routers for a particular hour of a day, wherein the router-level utilizations of the pair of core routers comprise proportions of traffic between the pair of core routers relative to all traffic in the network;

calculating a standard deviation and an autoregressive integrated moving average confidence interval for the router-level utilizations of the pair of core routers;

determining if, for the daily time series for the particular hour of the day, an hourly router-level utilization of the pair of core routers exceeds the standard deviation from an average utilization for the pair of core routers by a specified factor;

if a determination is made that the hourly router-level utilization of the pair of core routers exceeds the standard deviation from the average utilization for the pair of core routers by the specified factor, determining if the hourly router-level utilization of the pair of core routers exceeds the autoregressive integrated moving average confidence interval for the utilizations of the pair of core routers; and if a determination is made that the hourly router-level utilization of the pair of core routers exceeds the autoregressive integrated moving average confidence interval for the utilizations of the pair of core routers, marking the pair of core routers as responsible for the traffic pattern shift in the network;

performing, by the processor and on the pair of core routers, an entity-level analysis to identify, among a plurality of entities, an entity that is responsible for the traffic pattern shift in the network; and outputting, by the processor, traffic shift data that identifies the pair of core routers and the entity that is responsible for the traffic pattern shift in the network.

10. The method of claim 9, wherein the entity-level analysis comprises:
   selecting, from a plurality of entities between the pair of core routers, entities that are a major source of traffic to the pair of core routers;
   calculating an entity-level utilization for the entity, wherein the entity-level utilization comprises a proportion of traffic between the entity and a destination core router of the pair of core routers relative to all traffic between the pair of core routers;
   generating a daily time series for the plurality of entities between the pair of core routers, the daily time series comprising entity-level utilizations between an entity of the plurality of entities and the pair of core routers for a particular hour of the day;
   calculating a standard deviation and an autoregressive integrated moving average confidence interval for the utilizations of the pair of core routers for the traffic associated with the entity and the pair of core routers;
   if a determination is made that the hourly utilization of the pair of core routers for the traffic associated with the entity exceeds the standard deviation from the average utilization for the pair of core routers, determining if the hourly utilization of the pair of core routers for the traffic associated with the entity exceeds the autoregressive integrated moving average confidence interval for the utilizations of the pair of core routers; and
   if a determination is made that the hourly utilization of the pair of core routers for the traffic associated with the entity exceeds the autoregressive integrated moving average confidence interval for the utilizations of the pair of core routers, determining that the entity is responsible for the traffic pattern shift in the network.

11. The method of claim 9, further comprising:
   determining if the traffic pattern shift satisfies a time constraint; and
   in response to determining that the traffic pattern shift satisfies the time constraint, outputting the traffic shift data.

12. The method of claim 9, wherein the netflow data and the routing data are stored for a rolling time period comprising a number of days, and wherein a first-in-first-out model is used for storing the netflow data and the routing data.

13. The method of claim 9, wherein the entity comprises an Internet service provider autonomous system that is closest, among a plurality of Internet service provider autonomous systems, to an originating point of traffic associated with the pair of core routers.

14. The method of claim 9, wherein the entity comprises an Internet service provider autonomous system that is closest, among a plurality of Internet service provider autonomous systems, to the network.

15. A non-transitory computer storage medium having computer-executable instructions stored thereon that, when executed by a processor, cause the processor to perform operations, the operations comprising:
   obtaining netflow data for a plurality of core routers associated with a network and routing data associated with the plurality of core routers, the routing data being obtained from an interface inventory and a routing table;
   generating, based on the netflow data and the routing data, an augmented traffic matrix;
   performing, on the augmented traffic matrix, a router-level analysis to identify, among the plurality of core routers, a pair of core routers that are associated with a traffic pattern shift in the network, wherein the router-level analysis comprises:
      selecting, from the plurality of core routers, the pair of core routers;
      generating a daily time series for the pair of core routers, the daily time series comprising router-level utilizations of the pair of core routers for a particular hour of a day, wherein the router-level utilizations of the pair of core routers comprise proportions of traffic between the pair of core routers relative to all traffic in the network;
      calculating a standard deviation and an autoregressive integrated moving average confidence interval for the router-level utilizations of the pair of core routers;
      determining if, for the daily time series for the particular hour of the day, an hourly router-level utilization of the pair of core routers exceeds the standard deviation from an average utilization for the pair of core routers by a specified factor;
      if a determination is made that the hourly router-level utilization of the pair of core routers exceeds the standard deviation from the average utilization for the pair of core routers by the specified factor, determining if the hourly router-level utilization of the pair of core routers exceeds the autoregressive integrated moving average confidence interval for the utilizations of the pair of core routers; and
      if a determination is made that the hourly router-level utilization of the pair of core routers exceeds the autoregressive integrated moving average confidence interval for the utilizations of the pair of core routers, marking the pair of core routers as responsible for the traffic pattern shift in the network;
   performing, on the pair of core routers, an entity-level analysis to identify, among a plurality of entities, an entity that is responsible for the traffic pattern shift in the network; and
   outputting traffic shift data that identifies the pair of core routers and the entity that is responsible for the traffic pattern shift in the network.

16. The non-transitory computer storage medium of claim 15, wherein the entity-level analysis comprises:
   selecting, from a plurality of entities between the pair of core routers, entities that are a major source of traffic to the pair of core routers;
   calculating an entity-level utilization for the entity, wherein the entity-level utilization comprises a proportion of traffic between the entity and a destination core router of the pair of core routers relative to all traffic between the pair of core routers;
   generating a daily time series for the plurality of entities between the pair of core routers, the daily time series comprising entity-level utilizations between an entity of the plurality of entities and the pair of core routers for a particular hour of the day;
   calculating a standard deviation and an autoregressive integrated moving average confidence interval for the utilizations of the pair of core routers for the traffic associated with the entity and the pair of core routers;
   if a determination is made that the hourly utilization of the pair of core routers for the traffic associated with the entity exceeds the standard deviation from the average utilization for the pair of core routers, determining if the hourly utilization of the pair of core routers for the traffic associated with the entity exceeds the autoregressive integrated moving average confidence interval for the utilizations of the pair of core routers; and if a determination is made that the hourly utilization of the pair of core routers for the traffic associated with the entity exceeds the autoregressive integrated moving average confidence interval for the utilizations of the pair of core routers, determining that the entity is responsible for the traffic pattern shift in the network.

17. The non-transitory computer storage medium of claim 15, wherein the computer-executable instructions, when executed by the processor, cause the processor to perform operations further comprising:

determining if the traffic pattern shift satisfies a time constraint; and in response to determining that the traffic pattern shift satisfies the time constraint, outputting the traffic shift data.

18. The non-transitory computer storage medium of claim 15, wherein the netflow data and the routing data are stored for a rolling time period comprising a number of days, and wherein a first-in-first-out model is used for storing the netflow data and the routing data.

19. The non-transitory computer storage medium of claim 15, wherein the entity comprises an Internet service provider autonomous system that is closest, among a plurality of Internet service provider autonomous systems, to an originating point of traffic associated with the pair of core routers.

20. The non-transitory computer storage medium of claim 15, wherein the entity comprises an Internet service provider autonomous system that is closest, among a plurality of Internet service provider autonomous systems, to the network.

* * * * *